Oct. 11, 1955  G. MILLER  2,720,045
TRANSPARENCY VIEWER COMBINED EJECTOR AND LIGHT SWITCH
Filed June 8, 1951
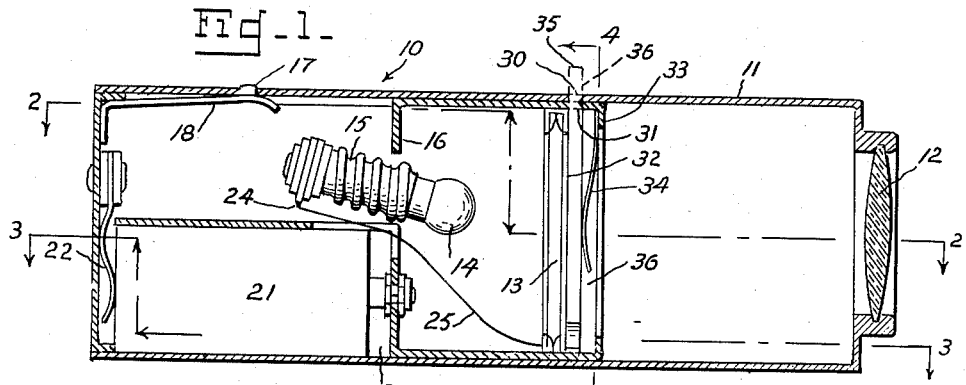
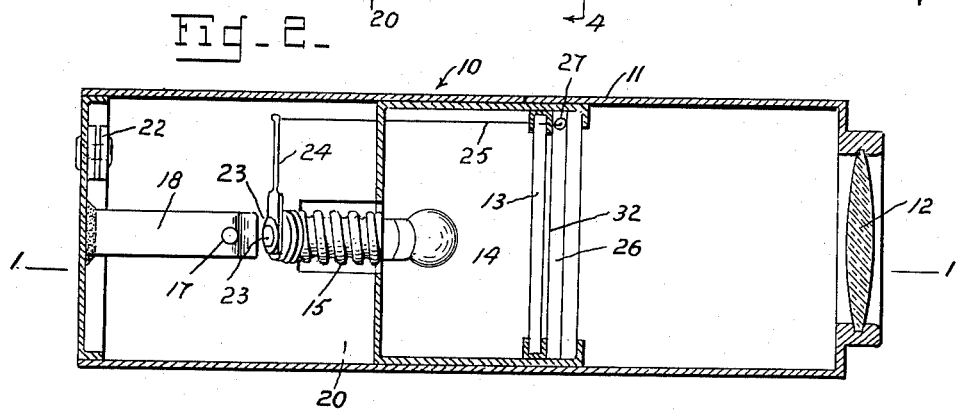
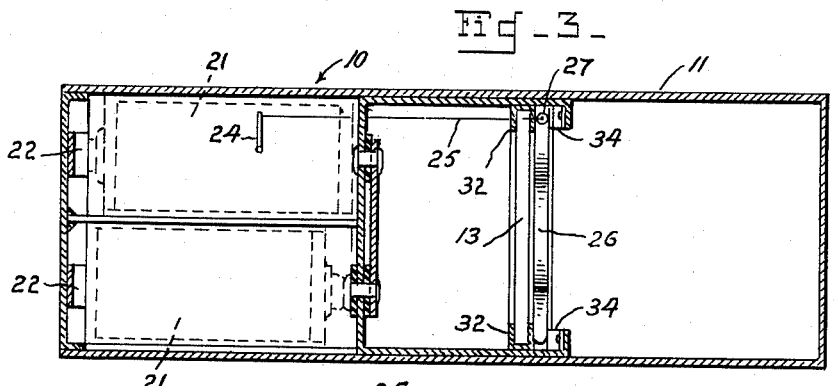
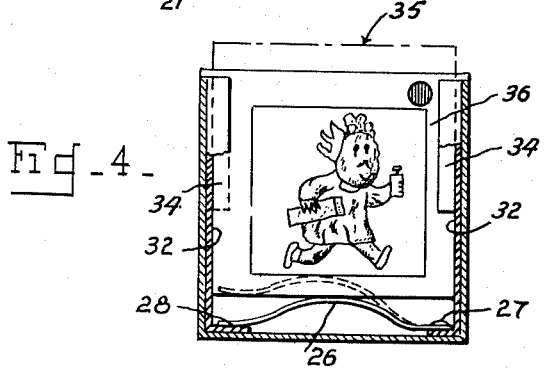
INVENTOR
Gustave Miller

United States Patent Office 2,720,045
Patented Oct. 11, 1955

2,720,045

TRANSPARENCY VIEWER COMBINED EJECTOR AND LIGHT SWITCH

Gustave Miller, Washington, D. C.

Application June 8, 1951, Serial No. 230,545

12 Claims. (Cl. 40—64)

This invention relates to a transparency viewer combined ejector and light switch and has for an object to provide an ejector or a combined ejector and light switch in a transparency viewer which will serve to eject the transparency from the viewer when it is no longer held manually depressed therein and further wherein the ejector also serves as a light switch when the transparency is being manually pressed thereagainst to complete the circuit to the lamp bulb to make the transparency visible.

A further object of this invention is to provide a combined transparency ejector and light switch.

Still a further object of this invention is to provide an ejector for a transparency viewer wherein the transparency may be placed into and held in the viewer and then when the manual pressure on the transparency is released, the transparency will be at least partially ejected from the viewer.

Still a further object of this invention is to provide a combined transparency ejector and light switch which yieldably resists the entry of the transparency into the viewer, completes the circuit to the lamp bulb as the transparency is pressed fully into the viewer, and then breaks the circuit as the pressure on the transparency is released and ejects the transparency at least partially from the viewer thus enabling the transparency to be quickly and readily removed therefrom and replaced by a new transparency.

With the foregoing and other objects in view, this invention comprises the combination, construction and arrangement of parts hereinafter set forth, claimed, and disclosed in the accompanying drawings wherein;

Fig. 1 is a longitudinal and sectional view through the viewer, on line 1—1 of Fig. 2;

Fig. 2 is a sectional view on line 2—2 of Fig. 1;

Fig. 3 is a sectional view on line 3—3 of Fig. 1;

Fig. 4 is a sectional view on line 4—4 of Fig. 1;

There is shown at 10 a transparency viewer to which this invention has been applied. Transparency viewer 10 includes a boxlike member 11 having a viewing lens 12 at one end thereof spaced from a light diffusing plate 13 for evenly diffusing the light from the lamp bulb 14, the lamp bulb 14 being received in a lamp socket 15 which together with the diffusing plate 13 is mounted in a removable skeleton framework 16. The skeleton framework 16 is secured in an open end of the boxlike member 11 opposite from the end having the viewing lens 12, by means of a catch 17 mounted on a spring 18 and cooperating with a suitable opening in a side of the boxlike member 11. The skeleton framework 16 also includes a compartment 20 below the lamp socket 15 for receiving a pair of electric batteries 21 yieldably held in the circuit to the lamp socket 15 and lamp bulb 14 by means of contact springs 22 and insulatably supported central contact 23 cooperating with the center contact of the lamp bulb 14 is connected by a conductor 24 to lead line 25 to an insulatably mounted bowed leaf spring 26 having its mounted end connected with the lead line 25. The other end of the bowed leaf spring 26 is normally spaced from contact, but when pressed downwardly will make an electric circuit with a ground contact member 28 for completing the circuit to the grounded socket member 15.

The boxlike member 11 is provided with a slot opening 30 through one side thereof arranged to coincide with a slot 31 in the skeleton framework 16. Leading from the slot 31 in the skeleton framework 16 are a pair of oppositely disposed guide tracks 32 of a width and shape to receive a transparency therebetween when inserted through the slots 30 and 31. Also secured to the skeleton framework 16 at 33 is a weak yieldable spring 34 extending into the path between the track guideways 32, there being one adjacent each guide trackway 32. These springs 34 serve to hold the transparency firmly in the guide trackways when it has been inserted fully therein so as to press it against the diffusing plate 13 and permit it to be viewed through the lens 12.

In operation the skeleton framework 16 may be entirely removed from the boxlike member 11 by merely depressing the spring supported latchpoint 17 and then inserting a slender member such as a nail file or key through the open slot 30 and pressing it against the diffusing plate 13 to eject the skeleton framework from the boxlike member for a ready replacement of the lamp bulb or electric batteries when necessary. With the batteries and a good lamp bulb in position, the circuit extends from ground through the batteries through the lamp socket through the bulb through lead line 25 and into the bowed leaf spring 26. When a transparency is to be viewed, it is inserted through the slot 30 and slot 31 into the guide trackways 32 and rests on the bowed leaf spring 26. Then the top edge 35 of the transparency 36 is pressed downwardly by one's fingers thus forcing the transparency 36 down in position and causing the bowed leaf 26 to make electrical contact with the grounding contact 28 completing the circuit to the lamp bulb 14 and lighting the lamp to make the transparency 36 visible through the lens 12. When the viewer has finished looking at the transparency 36, he merely releases his fingers from the top edge 35 of the transparency 36. By so doing, he releases the manual pressure on the bowed leaf spring 26 which then lifts up the bottom edge of the transparency 36 to at least partially eject the transparency through the slot 30 and cause a sufficiently substantial amount of the transparency 36 to extend up through the slot outside of the boxlike member so that it may be readily grasped with one's fingers and removed therefrom and then replaced with a new transparency. When in position within the guide trackways 32, the weak springs 34 press sidewardly against the transparency and hold it firmly against the diffusing plate 13 so that it may be properly viewed through the lens 12. There has thus been provided a combined means for completing the circuit to the lamp bulb when the transparency is held manually depressed in its guideways within the boxlike member and for partially ejecting the transparency from the boxlike member when the manual pressure on the edge of the transparency is released. This greatly speeds up the process of exchanging one transparency for another by facilitating both the exchange of the transparencies one for another, and by facilitating the proper and speedy lighting of the transparency as soon as it is in proper viewing position.

While the device has been shown and the structure described in detail, it is obvious that this invention is not to be considered as being limited to the exact form disclosed and changes in detail and construction may be made therein within the scope of what is claimed, without departing from the spirit of this invention.

Having thus set forth and disclosed the nature of this invention what is claimed is:

1. In a transparency viewer including a boxlike member having a light diffusing plate, a light bulb at one side of the plate, and an electric circuit arranged to connect the light bulb to a source of electricity; a combined transparency receiving and ejecting frame and circuit completing switch comprising a pair of spaced apart transparency guide tracks for slidably receiving the transparency therebetween, said guide tracks leading from a transparency receiving slot in one side of the boxlike member, and a leaf spring mounted opposite said transparency receiving slot and yieldably resisting the full entry of the transparency through the slot and arranged to at least partially eject the transparency when manual holding pressure thereon is released, said leaf spring being mounted in the circuit to the bulb to complete the circuit only while the transparency is manually held pressed thereagainst within the frame.

2. In a transparency viewer including a boxlike member having a light diffusing plate, a light bulb at one side of the plate, and an electric circuit arranged to connect the light bulb to a source of electricity; a combined transparency receiving and ejecting frame and circuit completing switch comprising a pair of spaced apart transparency guide tracks for slidably receiving the transparency therebetween, said guide tracks leading from a transparency receiving slot in one side of the boxlike member, and a spring mounted in the side of the boxlike member opposite said transparency receiving slot and yieldably resisting the full entry of the transparency through the slot and arranged to at least partially eject the transparency when manual holding pressure thereon is released, said spring being mounted at one end thereof in the circuit to the bulb, and a circuit completing contact member in the path of the other end of the spring arranged to complete the circuit to the bulb while the transparency is held manually pressed thereagainst.

3. In a transparency viewer including a boxlike member having a light diffusing plate, a light bulb at one side of the plate, and an electric circuit arranged to connect the light bulb to a source of electricity; a combined transparency receiving and ejecting frame and circuit completing switch comprising a pair of spaced apart transparency guide tracks for slidably receiving the transparency therebetween, said guide tracks leading from a transparency receiving slot in one side of the boxlike member, and a bowed leaf spring mounted in the side of the boxlike member opposite said transparency receiving slot and yieldably resisting the full entry of the transparency through the slot and arranged to at least partially eject the transparency when manual holding pressure thereon is released, said leaf spring being mounted at one end thereof in the circuit to the bulb, and a circuit completing contact member in the path of the other end of the leaf spring arranged to complete the circuit to the bulb while the transparency is held manually pressed thereagainst.

4. In a picture viewer including a boxlike member having a light diffusing plate, a light bulb at one side of the plate, and an electric circuit arranged to connect the light bulb to a source of electricity; a combined picture receiving and ejecting frame and circuit completing switch comprising a pair of spaced apart picture guide tracks for slidably receiving the picture therebetween, said guide tracks leading from a picture receiving slot in one side of the boxlike member, and spring means yieldably resisting the full entry of the picture through the slot and arranged to at least partially eject the picture when manual holding pressure thereon is released, said spring means being mounted in the circuit to the bulb to complete the circuit only while the picture is manually held pressed thereagainst within the frame.

5. In a picture viewer including a boxlike member having a light diffusing plate, a light bulb at one side of the plate, and an electric circuit arranged to connect the light bulb to a source of electricity; a combined picture receiving and ejecting frame and circuit completing switch comprising a pair of spaced apart picture guide tracks for slidably receiving the picture therebetween, said guide tracks leading from a picture receiving slot in one side of the boxlike member, and spring means mounted in the side of the boxlike member opposite said picture receiving slot and yieldably resisting the full entry of the picture through the slot and arranged to at least partially eject the picture when manual holding pressure thereon is released, said spring means being mounted in the circuit to the bulb, and a circuit completing contact member in the path of the spring means arranged to complete the circuit to the bulb while the picture is held manually pressed thereagainst.

6. In a picture viewer including a boxlike member having a light diffusing plate, a light bulb interiorly of said boxlike member on the side thereof opposite said plate, and an electric circuit arranged to connect the light bulb to a source of electricity; a combined picture receiving and ejecting frame and circuit completing switch comprising a pair of parallel spaced apart picture guide tracks for slidably receiving picture therebetween, said guide tracks leading from a picture receiving slot in one side of the boxlike member, and spring means on the side thereof opposite said picture receiving slot and yieldably resisting the full entry of the picture through the slot and arranged to at least partially eject the picture when manual holding pressure thereon is released, said spring means being connected in the circuit to the bulb, and a circuit completing contact member in the path of movement of the spring means arranged to complete the circuit to the bulb while the picture is held manually pressed thereagainst.

7. In a transparency viewer including a boxlike member having a light diffusing plate, a light bulb at one side of the plate, and an electric circuit arranged to connect the light bulb to a source of electricity; a combined transparency receiving and ejecting frame and circuit completing switch comprising a pair of spaced apart transparency guide tracks for slidably receiving the transparency therebetween, said guide tracks leading from a transparency receiving slot in one side of the boxlike member, means cooperating with said guide tracks for holding the transparency firmly therein, and a leaf spring mounted opposite said transparency receiving slot and yieldably resisting the full entry of the transparency through the slot and arranged to at least partially eject the transparency when manual holding pressure thereon is released, said leaf spring being mounted in the circuit to the bulb to complete the circuit only while the transparency is manually held pressed thereagainst within the frame.

8. In a transparency viewer including a boxlike member having a light diffusing plate, a light bulb at one side of the plate, and an electric circuit arranged to connect the light bulb to a source of electricity; a combined transparency receiving and ejecting frame and circuit completing switch comprising a pair of spaced apart transparency guide tracks for slidably receiving the transparency therebetween, said guide tracks leading from a transparency receiving slot in one side of the boxlike member, means cooperating with said guide tracks for holding the transparency firmly therein, and a spring mounted in the side of the boxlike member opposite said transparency receiving slot and yieldably resisting the full entry of the transparency through the slot and arranged to at least partially eject the transparency when manual holding pressure thereon is released, said spring being mounted at one end thereof in the circuit to the bulb, and a circuit completing contact member in the path of the other end of the spring arranged to complete the circuit to the bulb while the transparency is held manually pressed thereagainst.

9. In a transparency viewer including a boxlike member having a light diffusing plate, a light bulb at one side of the plate, and an electric circuit arranged to connect the light bulb to a source of electricity; a combined transparency receiving and ejecting frame and circuit completing switch comprising a pair of spaced apart transparency guide tracks for slidably receiving the transparency therebetween, said guide tracks leading from a transparency receiving slot in one side of the boxlike member, yieldable means cooperating with said guide tracks for holding the transparency firmly therein, and a bowed leaf spring mounted in the side of the boxlike member opposite said transparency receiving slot and yieldably resisting the full entry of the transparency through the slot and arranged to at least partially eject the transparency when manual holding pressure thereon is released, said leaf spring being mounted at one end thereof in the circuit to the bulb, and a circuit completing contact member in the path of the other end of the leaf spring arranged to complete the circuit to the bulb while the transparency is held manually pressed thereagainst.

10. In a transparency viewer including a boxlike member having a light diffusing plate, a light bulb at one side of the plate, and an electric circuit arranged to connect the light bulb to a source of electricity; a combined transparency receiving and ejecting frame and circuit completing switch, said frame providing transparency guide means for slidably receiving the transparency, said guide means leading from a transparency receiving slot in one side of the boxlike member, and said circuit completing switch comprising a spring mounted opposite said transparency receiving slot and yieldably resisting the full entry of the transparency through the slot and arranged to at least partially eject the transparency when holding pressure thereon is released, said spring being mounted in the circuit to the bulb to complete the circuit only while the transparency is held pressed thereagainst within the frame.

11. In a transparency viewer including a boxlike member having a light diffusing plate, a light bulb at one side of the plate, and an electric circuit arranged to connect the light bulb to a source of electricity; a combined transparency receiving and ejecting frame and circuit completing switch including transparency guide means for slidably receiving the transparency, said guide means leading from a transparency receiving slot in one side of the boxlike member, and said circuit completing switch comprising a spring mounted in the side of the boxlike member opposite said transparency receiving slot and yieldably resisting the full entry of the transparency through the slot and arranged to at least partially eject the transparency when holding pressure thereon is released, said spring being mounted at one end thereof in the circuit to the bulb, and a circuit completing contact member in the path of the other end of the spring arranged to complete the circuit to the bulb while the transparency is held pressed thereagainst.

12. In a picture viewer including a boxlike member having a light diffusing plate, a light bulb at one side of the plate, and an electric circuit arranged to connect the light bulb to a source of electricity; a combined picture receiving and ejecting means and circuit completing switch including picture guide means for slidably receiving the picture, said guide means leading from a picture receiving slot in one side of the boxlike member, and said circuit completing switch comprising spring means yieldably resisting the full entry of the picture through the slot and arranged to at least partially eject the picture when holding pressure thereon is released, said spring means being mounted in the circuit to the bulb to complete the circuit only while the picture is held pressed thereagainst within the boxlike member.

References Cited in the file of this patent

UNITED STATES PATENTS

| 1,712,854 | Thonet | May 14, 1929 |
| 1,989,803 | Hoben | Feb. 5, 1935 |
| 2,394,225 | Ashford | Feb. 5, 1946 |
| 2,495,047 | Afton | Jan. 17, 1950 |
| 2,520,432 | Robertson | Aug. 29, 1950 |
| 2,543,670 | Regenburg | Feb. 27, 1951 |
| 2,666,360 | Collins | Jan. 19, 1954 |

FOREIGN PATENTS

| 62,040 | Switzerland | Sept. 30, 1912 |